United States Patent [19]

Miyaura

[11] Patent Number: 5,720,791
[45] Date of Patent: Feb. 24, 1998

[54] METHOD OF PRODUCING AN OPTICAL LENS ELEMENT

[75] Inventor: Tomoko Miyaura, Habikino, Japan

[73] Assignee: Minolta Co., Ltd., Osaka, Japan

[21] Appl. No.: 399,645

[22] Filed: Mar. 7, 1995

[30] Foreign Application Priority Data

Aug. 3, 1994 [JP] Japan .................... 6-036867

[51] Int. Cl.$^6$ .................... C03B 40/02; C03C 17/27
[52] U.S. Cl. .................... 65/37; 65/23; 65/24; 65/31; 65/32.4; 65/37; 65/60.4; 65/61; 65/63; 65/64; 65/102
[58] Field of Search .................... 65/23, 24, 31, 65/32.2, 32.4, 37, 61, 60.4, 60.5, 63, 64, 102

[56] References Cited

U.S. PATENT DOCUMENTS

| | | | |
|---|---|---|---|
| H480 | 6/1988 | Welch | 65/24 X |
| 1,368,958 | 2/1921 | Miller | 65/23 |
| 2,201,049 | 5/1940 | Moore | 65/26 |
| 2,795,084 | 6/1957 | Littleton | 65/24 |
| 3,208,839 | 9/1965 | Nordberg | 65/24 |
| 3,598,635 | 8/1971 | Sagona | 65/60.4 X |
| 4,024,309 | 5/1977 | Pender | 428/312.6 |
| 4,526,600 | 7/1985 | Myers | 65/24 |
| 4,738,703 | 4/1988 | Izumitani et al. | 65/64 |
| 4,840,654 | 6/1989 | Pryor | 65/18.1 |
| 4,981,503 | 1/1991 | Segawa et al. | 65/30.1 |
| 5,087,279 | 2/1992 | Monji et al. | 65/64 |
| 5,090,982 | 2/1992 | Bradshaw et al. | 65/24 |
| 5,168,404 | 12/1992 | Miyazaki et al. | 65/37 X |
| 5,192,352 | 3/1993 | Kuwabara et al. | 65/102 X |
| 5,522,003 | 5/1996 | Ward et al. | 385/123 |

FOREIGN PATENT DOCUMENTS

| | | | |
|---|---|---|---|
| 52-6709 | 2/1977 | Japan | 65/24 |
| 55-11624 | 3/1980 | Japan . | |
| 57-140339 | 8/1982 | Japan | 65/31 |
| 60-210534 | 10/1985 | Japan . | |
| 62-105934 | 5/1987 | Japan | 65/37 |
| 62-202824 | 9/1987 | Japan | 65/37 |
| 62-207726 | 9/1987 | Japan . | |
| 62-256732 | 11/1987 | Japan | 65/37 |
| 62-297225 | 12/1987 | Japan | 65/37 |
| 63-151630 | 6/1988 | Japan | 65/37 |
| 4-265234 | 9/1992 | Japan . | |
| 5-163027 | 6/1993 | Japan | 65/37 |

*Primary Examiner*—Arlen Soderquist

[57] ABSTRACT

An optical lens element is produced by the following steps of:

preparing a glass pre-form;

forming a metal thin layer or a powder layer, said metal thin layer including gold, platinum, rhodium, nickel, or palladium; and pressing the glass pre-form with the metal thin layer against molding surfaces to form the optical lens element.

10 Claims, 2 Drawing Sheets

METHOD OF PRODUCING AN OPTICAL LENS ELEMENT

BACKGROUND OF THE INVENTION

1. Field of the Invention

The present invention relates to a method of producing an optical lens element, and more specifically relates to a method for producing an optical lens element by pressure forming a glass pre-form, and the glass-preform used in said production.

2. Description of the Related Art

Conventional methods for producing optical lens elements have been variously proposed, but in all such methods production occurs in a non-oxidizable gas atmosphere to prevent oxidation of the molding surface.

Techniques have been disclosed for improving release characteristics from a molding when forming carbon layer on a glass pre-form by vacuum deposition, sputtering, and ion plating methods for preventing adhesion such as disclosed in Japanese Laid-Open Patent Application No. 62-207726. In the aforesaid techniques, glass and molding are both heated until the glass attains a softened state, the glass in a softened state is molded by said molding (pressure molding), and thereafter the carbon layer of the glass surface is removed by oxidation processing.

When forming a carbon layer on glass as disclosed in Japanese Laid-Open Patent Application No. 62-207726, the layer obtained by vacuum deposition, sputtering, and ion plating methods is typically hard and difficult to stretch, such that the lens is easily damaged due to crazing. Therefore, the glass must be prepared beforehand in a configuration substantially similar to that of the lens to be obtained so as to limit the amount of deformation of the glass by pressure molding.

In order to remove the carbon layer, it must be subjected to, for example, an oxidation process at high temperature due to the strength of adhesion in its chemically stable state at room temperature. Thus, there is a danger of damage to the final configuration.

When, for example, titanium is included in the glass, the carbon reacts with the titanium in the glass constituent suing the process of forming the carbon layer, such that the glass is turned black and discolored.

SUMMARY OF THE INVENTION

In view of the aforesaid information, an object of the present invention is to provide a method for producing an optical lens element wherein the configuration of the molding surface is accurately transferred to the lens surface without the disadvantages of discoloration or fracturing, lens deformation, or adhesion between the glass and mold during pressure molding, and a glass pre-form used in said method.

BRIEF DESCRIPTION OF THE DRAWINGS

The above objects and features of the present invention are set forth with particularity in the appended claims. The present invention, both as to its organization and manner of operation, together with further objects and advantages thereof, may best be understood by reference to the following detailed description, taken in conjunction with the accompanying drawings.

DESCRIPTION OF THE PREFERRED EMBODIMENTS

Figure 1:
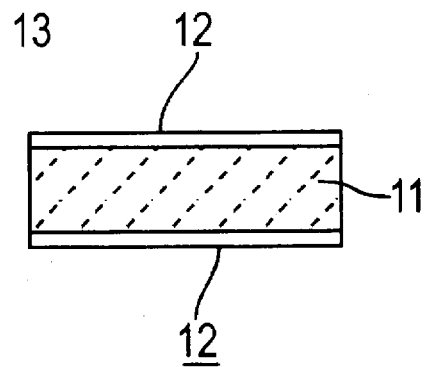
FIG. 1 is a section view of a first embodiment of the glass pre-form of the present invention.

In the first embodiment of the invention, a thin layer is formed on the surface of a glass pre-form using a material which is nonreactive to the glass material. Then, pressure molding accomplished through said thin layer with said glass in a softened state.

The aforesaid "glass pre-form" is glass shaped prior to pressure molding. The shape of this pre-formed member is a basic configuration which determines the desired finished configuration of the lens by subsequent pressure molding. For example, when the finished configuration is a concave lens or a convex lens, the glass pre-form may have a disk-like, cylindrical, spherical or globular configuration having the same volume as the lens. That is, it is desirable that the shape of the glass pre-form is substantially similar to the finished shape.

Glass materials useful for the aforesaid glass pre-form are not particularly limited. Examples of useful glass materials include $SiO_2$—$PbO$—$R_2$, $P_2O_2$—$TiO_2$—$Nb_2O_5$, $SiO_2$—$B_2O_3$—$La_2O_3$, $SiO_2$—$B_2O_3$—$R_2O$, $SiO_2$—$B_2O_3$—$BaO$, $P_2O_3$—$Al_2O_3$—$R_2O$—$F$ and the like.

Examples of useful materials which are nonreactive with the aforesaid glass materials include boron nitride, molybdenum sulfide and like compounds, and gold, platinum, rhodium, nickel, palladium and like metals. It is particularly desirable to use boron nitride when using $P_2O_2$—$TiO_2$—$Nb_2O_5$ as the glass material, and gold when using $SiO_2$—$B_2O_3$—$La_2O_3$ or $SiO_2$—$B_2O_3$—$R_2O$ as the glass material.

As previously described, in the present embodiment a thin layer is formed on a glass pre-form using a material which is nonreactive to the glass material. The thin layer may be a metal thin layer or a powder layer of small particles if the surface roughness of the layer is less than that of the lens being produced.

The powder layer may be produced by, for example, instantaneous vaporization and deposition of boron nitride, molybdenum sulfide or like compounds, or gold, platinum or like metal in an atmosphere of inert gas or nitrogen at in a vacuum CVD at a pressure of 0.01–10 Torr. However, the size of the particles is less than 0.5 μm in general, and a powder layer of less than 0.1 μm, and preferably less than 0.05 μm can easily be obtained by changing the degree of vacuum and speed of vaporization or chemical decomposition. When the particle diameter is greater than 0.1 μm, the surface roughness of less than 0.05 μm cannot be achieved.

The practical range of thickness of the powder layer is 100–5,000 Å, and preferably 200–300 Å. When the powder layer thickness is less than 100 Å, it is difficult to form a uniform power layer, and effectiveness is reduced. When the powder layer thickness exceeds 5,000 Å, profile regularity of the lens is reduced during pressure molding.

The powder layer having a surface roughness less than the surface roughness of the lens may be produced by vacuum deposition, sputtering, or ion plating of Group Ib and Group VIII transition metals which are nonreactive to glass and are relatively stretchable such as gold, platinum, rhodium, nickel, palladium and the like. The metal thin layer may be different from the aforesaid powder layer of aggregated particles, and may be formed as a smooth thin layer in an amorphous state, polycrystalline state, or mixture thereof.

The practical range of thickness of the metal thin layer is 10–500 Å, and preferably 10–200 Å. When layer thickness is less than 10 Å, it is difficult to form a uniform thin layer, and effectiveness is reduced. When layer thickness exceeds 500 Å, profile regularity of the lens is reduced by pressure molding.

After thin layer formation, the glass pre-form is pressure molded in a softened state through the thin layer. Since the glass is pressure molded in a softened state with the thin layer interposed between the glass and the molding surface, adhesion to the mold is prevented during pressure molding. Although the glass pre-form is deformed in accordance with the shape of the metal mold surface during pressure molding via a metal mold, the deformation and extension of the thin layer is in accordance with the amount of deformation of the glass via the stretching of the thin layer, and particularly in the case of a metal thin layer formed on the glass pre-form. Accordingly, fracturing of the glass and adhesion of the glass on the mold do not occur, such that the shape of the metal mold is accurately transferred to the surface of the glass.

It is important that the surface layer of the mold confront the glass during pressure molding. If general conditions are provided such that the mold has adequate hardness and strength relative to the application of heat, and pores and other defects are absent so as to allow mirror-like precise processing, the parent material of the mold and the material of the surface layer thereof need not be particularly limited. Accordingly, the material of the mold may be suitably selected from a broad range of mold materials without requiring that expensive material be used.

Pressure molding in the softened state is an essential condition during pressure molding, and heat is to be applied prior to pressure molding to the glass pre-form and mold independently, or simultaneously. Furthermore, the temperature of both the molded object and the mold may be either identical or different.

The molding pressure may be a pressure adequate to transfer the surface configuration of the mold to the glass pre-form.

After pressure molding, the thin layer is removed from the glass surface. When the thin layer is a powder layer, it can be removed by inert gas ion irradiation, ultrasonic cleaning, or wiping up. Specifically, removal by inert gas ion irradiation is accomplished by irradiating the inert gas ions toward the molded lens element, so that the powder is kicked out from the lens. The inert gas ions is obtained by discharging a high frequency alternating current or a direct current in an inert gas atmospher at a pressure of 0.001–0.1 Torr, and ideally 0.005–0.05 Torr. Ultrasonic cleaning ultrasonically removes the powder via a cleaning fluid including a surface-active agent, and wiping up is simply removing the powder using a soft cloth.

When the thin layer is formed of the previously mentioned Group Ib or Group VIII metals, chemical etch cleaning may be used to remove the metal in addition to the aforesaid methods. Chemical etch cleaning removes the metal thin layer by immersing the lens in a liquid chemical compound which does not damage glass and fuse the metal. For example, nitrosyl chloride or strong alkaline solvent may be used. Furthermore, generally available commercial metallized film stripping agent may be used.

When the previously described methods are used, the thin layer can be removed without damage to the molded curved surface of the lens.

First Embodiment

A lens comprising $SiO_2$—$B_2O_3$—$La_2O_3$ (transition point: 623° C.) preformed into a circular disk glass 11 (diameter: 18 mm; thickness: 3 mm), as shown in FIG. 1. A gold black powder layer 12 (thickness: 500 Å) having a particle diameter of about 0.01 μm was formed on the top and bottom surfaces of circular glass 11 by vacuum deposition at a vaporization rate of 250 Å/sec in a nitrogen atmosphere at a pressure of 1 Torr to obtain glass pre-form 13. Furthermore, gold black was formed by vaporizing gold to a powder in a low vacuum.

Figure 2:
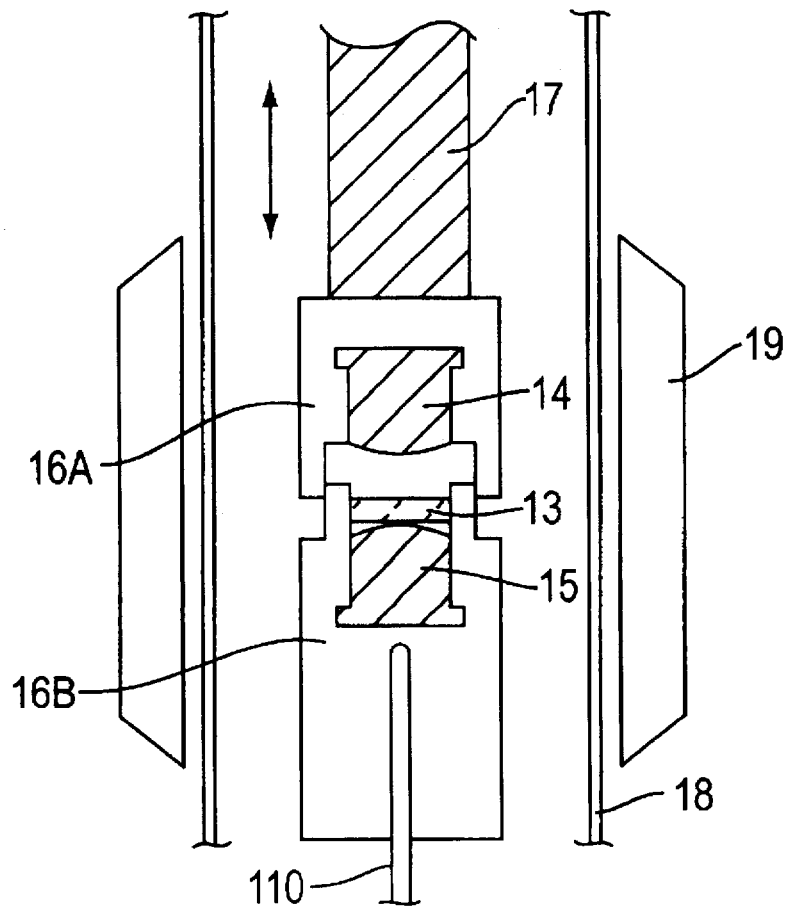
FIG. 2 is a section view of the essential portion of a first embodiment of the pressure molding device of the present invention.

The pressure molding device used in the present embodiment is shown in FIG. 2. This molding device is provided with a top mold 14 (material: silicone carbide) having a molding surface finished to a precise mirrored surface on a convex spherical surface and a support mold 16A (material: silicone carbide) for supporting said top mold, and a bottom mold 15 (material: silicone carbide) and a support mold 16B (material: silicone carbide). Support mold 16A moves downward integratedly with top mold 14 via push bar 17 (material: stainless steel), and engages support mold 16B which is integrated with bottom mold 15. Heating light source 19 is provided together with a condensing mirror on the exterior surface of transparent silica tube 18. Mold temperature is measured by thermocouple 110 embedded in support mold 16B, such that temperature of support mold 16B is controlled by heating light source 19 together with a condensing mirror.

The previously mentioned glass pre-form 13 was placed between top mold 14 and bottom mold 15 in a nitrogen atmosphere. Glass pre-form 13 together with molds 14, 15, 16A, and 16B were heated to 670° C. via heating light source 19 in conjunction with the condensing mirror. Under these conditions, push bar 17 applied a load on top mold 14 and support mold 16A to accomplish pressure molding (pressure: 50 kg/cm$^2$ for 30 seconds). Glass pre-form 13 was prevented from adhering to the mold by means of a gold black powder layer formed on said glass pre-form.

Then, the pressure applied by push bar 17 was removed, and the pressure molded object between molds 14, 15, 16A, and 16B was left in place to cool the inner glass 11. Thereafter, the pressure molded object was removed. A powder layer of the previously mentioned gold black was adhered to the surface of the pressure molded object. This gold black powder layer was subsequently physically removed by 10 min irradiation of argon ion obtained by applying RF power of 200 W in an argon atmosphere at a pressure of 0.02 Torr. A lens of finished configuration was thus obtained.

The obtained glass pre-form was a biconcave spherical lens having a diameter of 18 mm. This lens had a concave spherical surface corresponding to the convex spherical surfaces of top mold 14 and bottom mold 15, said lens having a high degree of profile regularity directly transferred from said molds. Optical characteristics of the lens such as transmittance and refractive index and the like were excellent.

Second Embodiment

Figure 3:
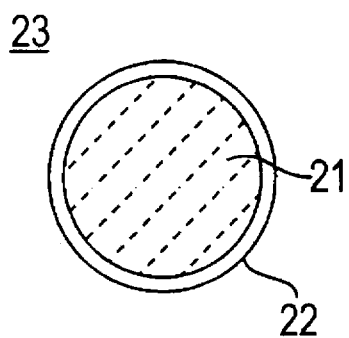
FIG. 3 is a section view of another embodiment of the glass pre-form of the present invention.

A lens comprising $P_2O_2$—$TiO_2$—$Nb_2O_5$ (transition point: 598° C.) preformed into a spherical glass 21 (diameter: 10 mm), as shown in FIG. 3. A powder layer of boron nitride (thickness: 1500 Å) having a particle diameter of about 0.08 μm was formed on the surface of spherical glass 21 by vacuum deposition of boron in a nitrogen atmosphere at a pressure of 1 Torr to obtain pre-form 23.

Figure 4:
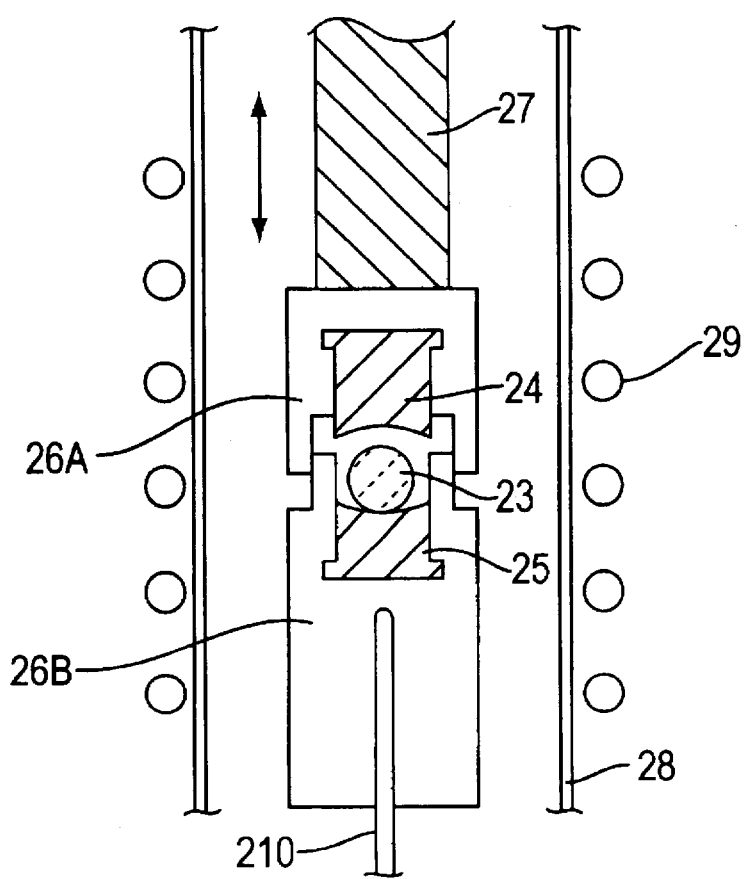
FIG. 4 is a section view of the essential portion of another embodiment of the pressure molding device of the present invention.

FIG. 4 shows the pressure molding device used in the present embodiment. This molding device is provided with a top mold 24 (material: hard metal) having a molding surface finished to a precise mirrored surface on a concave spherical surface and a support mold 26A (material: high density carbon) for supporting said top mold, and a bottom mold 25 (material: hard metal) and a support mold 26B (material: high density carbon). Support mold 26A moves downward integratedly with top mold 24 via push bar 27 (material: stainless steel), and engages support mold 26B which is integrated with bottom mold 25.

Induction heating source 29 is provided together with a high frequency coil on the exterior surface of ceramic tube 28. Mold temperature is measured by thermocouple 210 embedded in support mold 26B, such that temperature is controlled by induction heating source 29 together with a high frequency coil.

The previously mentioned glass pre-form 23 was placed between top mold 24 and bottom mold 25, and the pressure molded object 23 was heated to 650° C. together with molds 24, 25, 26A, and 26B via induction heating source 29 in conjunction with the high frequency coil in an argon atmosphere. Under these conditions, push bar 27 applied a pressure molding load on top mold 24 and support mold 26A (pressure 50 kg/cm$^2$ for 60 seconds).

The glass pre-form was prevented from adhering to the mold due to the presence of the boron nitride powder layer between the mold then the glass pre-form.

Then, the pressure applied by push bar 27 was removed, and the pressure molded object between molds 24, 25, 26A, and 26B was left in place to cool the inner glass 11. Thereafter, the pressure molded object was removed. A powder layer of the previously mentioned boron nitride was adhered to the surface of the pressure molded object. This boron nitride powder layer was subsequently removed by 15 minute ultrasonic cleaning by immersing the molded object in a cleaning solution containing a surface-active agent. A lens of finished configuration was thus obtained.

The obtained glass pre-form was a biconvex spherical lens having a diameter of 15 mm. This lens had a convex spherical surface corresponding to the concave spherical surfaces of top mold 24 and bottom mold 25, said lens having a high degree of profile regularity directly transferred from said molds. Optical characteristics of the lens such as transmittance and refractive index and the like were excellent.

Reference Example 1

A carbon layer having a thickness of 500 Å was formed by vacuum deposition on the surface of glass pre-forms of the same configuration and materials as those in the first and second embodiments using the method disclosed in Japanese Examined Patent Application No. HEI2-31012. Thereafter, the obtained glass pre-forms were pressure molded under identical conditions to the first and second embodiments for comparison. The carbon layer was removed by 10 minutes treatment in an atmosphere of oxygen at 400° C.

The results of comparison of the first and second embodiments and reference example 1 are shown in Table 1.

TABLE 1

| Material | Shape | Layer thickness | Obtained Lens | Cleaning method | |
|---|---|---|---|---|---|
| gold black | particle | 500 Å | Good | argon ion irradiation | Emb. 1 |
| boron nitride | particle | 1500 Å | Good | ultrasonic | Emb. 2 |
| carbon | thin layer | 500 Å | many fractures | high temperature oxidation | Ref. 1 |

Third Embodiment

A lens comprising $SiO_2$—$B_2O_3$—Ba (transition point: 623° C.) preformed into a circular glass 11 (diameter: 20 mm; thickness 3 mm), as shown in FIG. 1. A gold thin layer 12 (thickness: 500 Å) was formed on the top and bottom surfaces of circular glass 11 by sputtering in a vacuum of $2\times10^{-5}$ Torr to obtain pre-form 13.

The pressure molding device used in the present embodiment is that used in the first embodiment shown in FIG. 2. The pressure molded object was preventing from adhering to the mold through the use of the gold layer interposed between the mold and the glass pre-form.

After pressure molding, the pressure applied by push bar 17 was removed, and the pressure molded object between molds 14, 15, 16A, and 16B was left in place to cool the inner glass 11. Thereafter, the pressure molded object was removed.

This gold thin layer was subsequently physically removed by 10 minute irradiation of argon ions obtained by applying RF power of 200 W in an argon atmosphere at a pressure of 0.02 Torr. A lens of finished configuration was thus obtained.

The obtained lens was a biconcave spherical lens having a diameter of 20 mm. This lens had a concave spherical surface corresponding to the convex spherical surfaces of top mold 14 and bottom mold 15, said lens having a high degree of profile regularity directly transferred from said molds. Optical characteristics of the lens such as transmittance and refractive index and the like were excellent.

Fourth Embodiment

A platinum thin layer (thickness: about 15 Å) was formed in the aforesaid manner on a glass pre-form of $SiO_2$—$B_2O_3$—Ba (transition point: 658° C.) used as the glass material. Pressure molding was likewise performed in the same manner at a temperature of 690° C. This time the platinum thin layer was removed by chemical etch cleaning using aqua regia (main constituent: nitrosyl chloride) diluted five times.

Fifth Embodiment

Glass material $SiO_5$—$TiO_2$—$Nb_2O_5$ (transition point: 598° C.) was preformed into a spherical glass 21 (diameter: 10 mm), as shown in FIG. 3. A palladium thin layer 22 (thickness: 200 Å) was formed on the surface of spherical glass 21 by vacuum deposition in a vacuum of $2\times10^{-5}$ Torr to obtain pre-form 23.

The pressure molding device used in the present embodiment is that used in the second embodiment shown in FIG. 4, and pressure molding was accomplished under the same conditions as described in the second embodiment (molding temperature: 610° C.). The pressure molded object was preventing from adhering to the mold through the use of the palladium thin layer interposed between the mold and the glass pre-form.

After pressure molding, the pressure applied by push bar 27 was removed, and the pressure molded object between molds 24, 25, 26A, and 26B was left in place to cool the inner glass. Thereafter, the pressure molded object was removed.

The palladium thin layer adhering to the surface of the pressure molded object was removed by metallized film stripping agent (a commercial strong alkali solvent). A lens of finished configuration was thus obtained.

The obtained lens was a biconvex spherical lens having a diameter of 15 mm. This lens had a convex spherical surface corresponding to the concave spherical surfaces of top mold 24 and bottom mold 25, said lens having a high degree of profile regularity directly transferred from said molds. Optical characteristics of the lens such as transmittance and refractive index and the like were excellent.

Sixth Embodiment

A nickel thin layer (thickness: about 50 Å) was formed in the aforesaid manner on a glass pre-form of $SiO_2$—$B_2O_3$—$R_2$ (transition point: 557° C.) used as the glass material. Pressure molding was likewise performed in the same manner at a temperature of 620° C. This time the nickel thin layer was removed by chemical etch cleaning using nitric acid diluted five times.

Seventh Embodiment

A rhodium thin layer (thickness: about 150 Å) was formed in the aforesaid manner on a glass pre-form of $SiO_2$—$R_2O$—Pb (transition point: 443° C.) used as the glass material. Pressure molding was likewise performed in the same manner at a temperature of 500° C. This time the rhodium thin layer was physically removed by ion irradiation in the same manner as described in the first embodiment.

Reference Example 2

A carbon layer having a thickness of 200 Å was formed by sputtering on the surface of glass pre-forms of the same configuration and materials as those in the third and fourth embodiments using the method disclosed in Japanese Examined Patent Application No. HEI2-31012. Thereafter, the obtained glass pre-forms were pressure molded under identical conditions to the third and fourth embodiments for comparison. The carbon layer was removed by 10 minutes treatment in an atmosphere of oxygen at 400° C.

The results of comparison of the third through seventh embodiments and reference example 2 are shown in Table 2.

TABLE 2

| Material | Layer thickness | Molding results | Cleaning method | |
|---|---|---|---|---|
| Gold | 500 Å | Superior | Plasma irradiation | Emb. 3 |
| Platinum | 15 Å | Superior | Etching with aqua regia | Emb. 4 |
| Palladium | 200 Å | Superior | Metallizing film stripping agent | Emb. 5 |
| Nickel | 50 Å | Superior | Etching with nitric acid | Emb. 6 |
| Rhodium | 150 Å | Superior | Plasma irradiation | Emb. 7 |

TABLE 2-continued

| Material | Layer thickness | Molding results | Cleaning method | |
|---|---|---|---|---|
| Carbon | 200 Å | Not possible to use glass containing titanium | High temperature oxidation | Ref. 2 |

What is claimed is:

1. A method of producing an optical lens element comprising the steps of:

preparing a glass pre-form;

forming a metal thin layer on the glass pre-form, said metal thin layer including gold, platinum, rhodium, nickel, or palladium;

pressing the glass pre-form with the metal thin layer against molding surfaces to form the optical lens element; and removing the metal thin layer from the glass pre-form without damage to molded curved surfaces of the optical lens element.

2. A method as claimed in claim 1, wherein the metal thin layer is 10 to 500 Å in thickness.

3. A method as claimed in claim 1, wherein the metal thin layer is formed by vacuum deposition, sputtering, or ion plating.

4. A method as claimed in claim 1, further comprising the step of heating the glass pre-form and the molding surface before the pressing step.

5. A method of producing an optical lens element comprising the steps of:

preparing a glass pre-form;

forming a metal thin layer on the glass pre-form, said metal thin layer including gold, platinum, rhodium, nickel, or palladium;

pressing the glass pre-form with the metal thin layer against molding surfaces to form the optical lens element; and removing the metal thin layer by inert gas ion irradiation, ultrasonic cleaning, chemical etch cleaning, or wiping up after the pressing step.

6. A method of producing an optical lens element comprising the steps of:

preparing a glass pre-form;

forming a platinum layer on the glass pre-form;

pressing the glass pre-form with the platinum layer against molding surfaces; and removing the platinum layer by inert gas irradiating toward the pressed glass pre-form.

7. A method of producing an optical lens element comprising the steps of:

preparing a glass pre-form;

forming a gold thin layer on the glass pre-form;

pressing the glass pre-form with the gold thin layer against molding surfaces; and removing the gold thin layer from the glass pre-form without damage to a molded curved surface of the optical lens element.

8. The method as claimed in claim 7,
wherein the gold layer is removed from the pressed glass pre-form by plasma irradiation toward said pre-form in the removing step.

9. A method of producing an optical lens element comprising the steps of:
preparing a glass pre-form;
forming a platinum thin layer on the glass pre-form;
pressing the glass pre-form with the platinum layer against molding surfaces; and
removing the platinum layer from the glass pre-form without damage to a molded curved surface of the optical lens element.

10. The method as claimed in claim 9,
wherein the platinum layer is removed from the pressed glass pre-form by chemical etch cleaning in the removing step.

* * * * *